United States Patent
Son et al.

(10) Patent No.: US 7,501,636 B1
(45) Date of Patent: Mar. 10, 2009

(54) NANOTUNNELING JUNCTION-BASED HYPERSPECTAL POLARIMETRIC PHOTODETECTOR AND DETECTION METHOD

(75) Inventors: Kyung-ah Son, Moorpark, CA (US); Jeongsun J. Moon, Moorpark, CA (US); Goutam Chattopadhyay, Pasadena, CA (US); Anna Liao, Montrose, CA (US); David Ting, Arcadia, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 53 days.

(21) Appl. No.: 11/858,230

(22) Filed: Sep. 20, 2007

(51) Int. Cl.
*G01T 1/24* (2006.01)
(52) U.S. Cl. .................. 250/370.14; 257/414
(58) Field of Classification Search ............... 250/332, 250/370.01, 370.14; 257/414
See application file for complete search history.

(56) References Cited

U.S. PATENT DOCUMENTS

| | | | |
|---|---|---|---|
| 6,765,190 B2 | 7/2004 | Jordan | |
| 6,812,117 B1 | 11/2004 | Tringe | |
| 6,815,706 B2 | 11/2004 | Li et al. | |
| 6,844,566 B2 | 1/2005 | Wasshuber | |
| 6,846,682 B2 | 1/2005 | Heath et al. | |
| 6,867,427 B2 | 3/2005 | Zhang et al. | |
| 6,882,051 B2 | 4/2005 | Majumdar et al. | |
| 6,911,682 B2 | 6/2005 | Ruekes et al. | |
| 6,919,730 B2 | 7/2005 | Cole et al. | |
| 6,946,851 B2 | 9/2005 | Lee et al. | |
| 7,256,466 B2 * | 8/2007 | Lieber et al. | 257/414 |
| 2002/0114557 A1 | 8/2002 | Zhang et al. | |
| 2002/0117659 A1 | 8/2002 | Lieber et al. | |
| 2004/0041617 A1 | 3/2004 | Snider et al. | |

* cited by examiner

*Primary Examiner*—David P Porta
*Assistant Examiner*—Mark R Gaworecki
(74) *Attorney, Agent, or Firm*—Mark Homer

(57) ABSTRACT

A photodetector, detector array, and method of operation thereof in which nanojunctions are formed by crossing layers of nanowires. The crossing nanowires are separated by a few nm thick electrical barrier layer which allows tunneling. Each nanojunction is coupled to a slot antenna for efficient and frequency-selective coupling to photo signals. The nanojunctions formed at the intersection of the crossing wires defines a vertical tunneling diode that rectifies the AC signal from a coupled antenna and generates a DC signal suitable for reforming a video image. The nanojunction sensor allows multi/hyper spectral imaging of radiation within a spectral band ranging from terahertz to visible light, and including infrared (IR) radiation. This new detection approach also offers unprecedented speed, sensitivity and fidelity at room temperature.

24 Claims, 6 Drawing Sheets

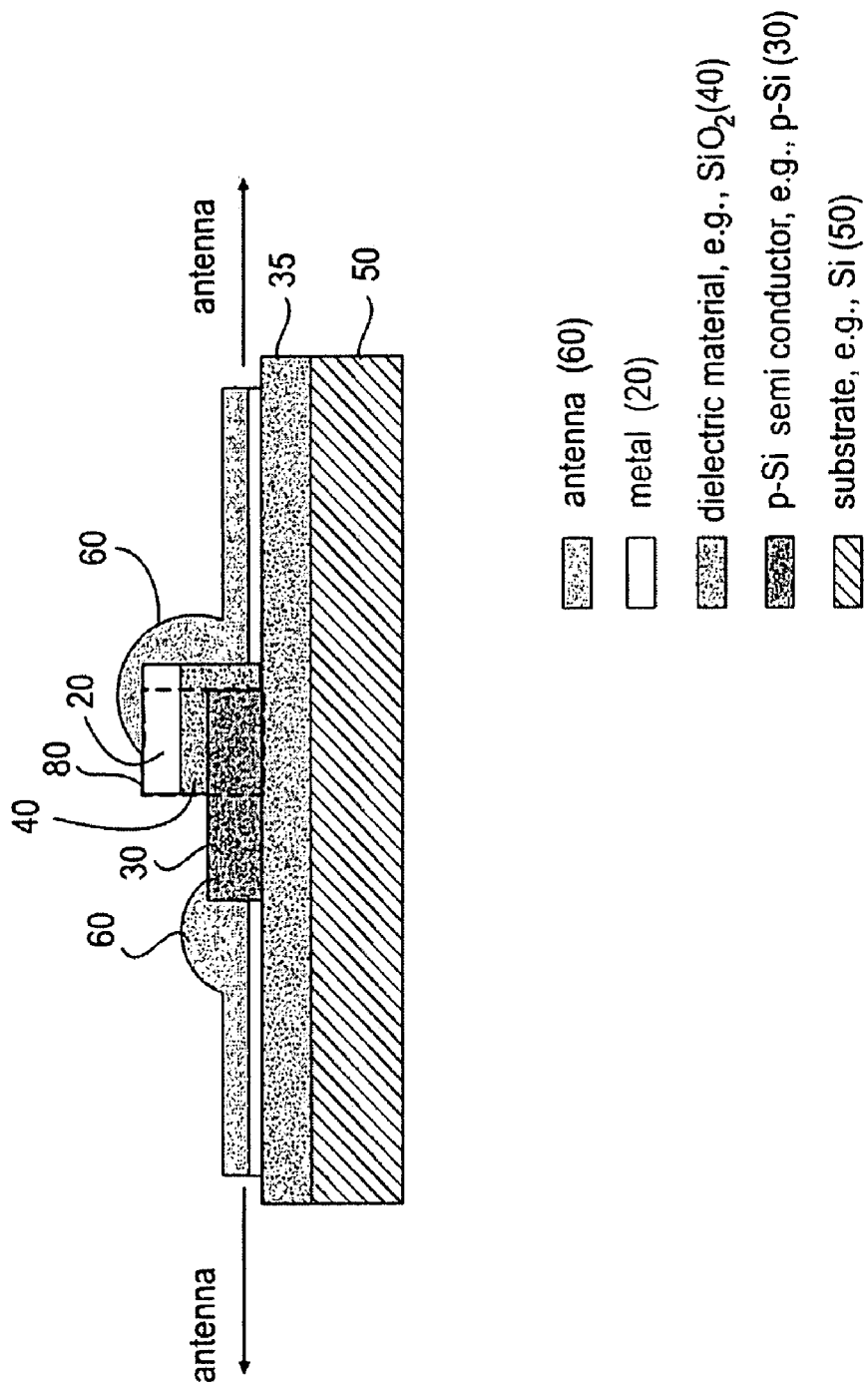

NANOTUNNELING JUNCTION-BASED HYPERSPECTAL POLARIMETRIC PHOTODETECTOR AND DETECTION METHOD

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND OF THE INVENTION

1. Field of the Invention

The present invention generally relates to photodetectors and, more particularly, to a photodetector that detects radiation within a spectral band ranging from terahertz to visible light, including infrared (IR) radiation. The disclosed detector comprises a high density nano-tunneling-junction-based photodetector array, rather than by conventional thermal or photodetectors. This detection mechanism improves response time and sensitivity, and avoids the need for cooling to cut thermal noise.

2. Description of Prior Art

A focal plane array (FPA) is a matrix of detector cells attached to a semiconductor chip. The detector cells absorb IR radiation, convert it into electrons, and send a voltage signal in response to form an image. Technically, FPAs operate much like a charge coupled device (CCD), which is a counterpart used in the visible light portion of the spectrum. CCDs are commonly used in cameras. The two main types of conventional photodetectors are thermal and photo detectors.

Thermal detectors sense the thermal effects of incident radiation in various ways. For example, bolometers and microbolometers sense changes in resistance. Thermocouples and thermopiles sense a thermoelectric effect. While these thermal detectors can be operated at room temperature, they present several drawbacks, particularly, low detectivity and slow response time, which limits their applications.

Photodetectors employ semiconductors in which incident photons cause electric excitations. An example is a photovoltaic detector based upon a p-n transistor junction, in which photoelectric current appears upon illumination. The response time and sensitivity of photodetectors can be much higher. Indeed, the current state-of-the-art IR photon detectors offers high detectivity (i.e. signal-to-noise ratio) and very fast response time. However, they require cryogenc cooling to suppress the thermally-generated noise in semiconductors. The requirement of cryo-cooling makes semiconductor-based photon detectors bulky, heavy, expensive, dependent on additional power supplies, and impractical for many applications.

Uncooled and room temperature sensors would offer unique advantages over existing cryogenic sensors with their complicated problems (including additional power requirements, thermal shielding, and limited lifetime) and additional weight and bulk, especially for space and airborne applications, provided that high detectivity and fast response times can be attained. "Uncooled" refers to those not cooled cryogenically to 77 K or below. "Room temperature" refers to those kept at above 300 K.

For example, infrared (IR) detectors that could operate without cryogenic cooling, and especially those that can operate at room temperature, have the potential to provide improved night vision capabilities for search and rescue applications as well as space and science applications, packaged in a device of extremely small size, weight, and power. This would significantly reduce the cost and accelerate the implementation of sensor for applications such as observation and surveillance, and also enable imaging sensors for new platforms such as robotics and micro-air vehicles.

Unfortunately, to date the performance of uncooled and room temperature sensors has been inferior to that of cooled sensors. This performance gap limits the number of applications and precludes the widespread use of uncooled infrared sensors in most photon (including IR) sensor applications. A survey of available sensors demonstrates this. For instance, uncooled thermal FPAs have been used in large array formats with an average f/1 noise-equivalent temperature-difference of 8.6 mK for VOx detectors and 30 mK for amorphous Si microbolometers. But thermal FPAs suffer from low detectivity ($10^8$-$10^9$ cmHz$^{1/2}$/W) and slow response time (tens of msec).

On the other hand, high performance IR photon detectors, such as HgCdTe and InSb, require cryogenic cooling to suppress "dark current" in order to approach detectivities over $10^{11}$ cmHz$^{1/2}$/W. The same issues arise with narrowband detectors like quantum-well-intersubband-photon detectors (QWIP).

Multi- or hyperspectral imagers deployed in NASA's Earth Observing System-1 (EOS-1) offer enabling capabilities for extracting IR signals through a plurality of environments. However, this and other known systems operating in a one-dimensional scanned mode are complex with moving optical filters, and often are power-hungry. Furthermore, current state-of-the-art FPAs are limited to no more than 4 colors, using either HgCdTe or quantum well infrared photodetectors (QWIP). The vertical integration of wavelength-selective QWIPs or HgCdTe detectors in a 3D cube configuration have an inherent limitation due to severe challenges in material growth, spectral resolution at each pixel, and read-out circuitry/power dissipation.

In sum, none of the current state-of-the-art imagers/FPAs offers the functionality of simultaneous multispectral and polarimetric sensing, and the conventional IR detection approaches that they rely on fail to achieve the necessary performance metrics. Consequently, what is desired is a hyperspectral and polarimetric photodetector configuration suitable for forming a focal plane array (FPA) with high resolution and high frame rate, but without any need for cryogenic cooling. This would have particular advantage for satellite-based imaging applications as well as a variety of other commercial applications.

SUMMARY OF THE INVENTION

It is a primary object of this invention to provide an improved photodetector array that enables uncooled, frequency tunable, and low-power IR imaging with a fast frame rate and temporal response, high directivity and high spatial resolution.

It is another object to provide a photodetector that detects radiation within a spectral band ranging from terahertz to infrared (IR) radiation, as a result of quantum mechanical tunneling at high density nano tunneling junctions in a nano-tunneling-junction-based photodetector array, rather than by conventional thermal or photodetectors.

It is another object to provide a nano-tunneling-junction-based photodetector array capable of simultaneous hyperspectral and polarimetric sensing on a single FPA chip for imaging a spectral band ranging from terahertz to IR.

In accordance with the foregoing objects, the present invention is a nano-tunneling-junction-based photodetector array comprising two crossing stacks of nanowires that form multiple nanojunctions, the two stacks being separated by a few nm thick electrical barrier layer. Each nanojunction is integrated with a slot antenna for efficient and frequency-selective coupling to incoming photon signals.

The nanojunction formed by each pair of crossing wires with intermediate barrier layer defines a nano-vertical transport diode, which rectifies the AC signal from a coupled antenna and generates a DC signal for the readout circuitry. The charge flow across the nanojunctions is dominated by quantum mechanical tunneling rather than thermionic emission. Quantum mechanical tunneling is a fast process compared to thermionic emission and reflects nonlinear behavior of the tunneling current-voltage characteristics, which can be used for rectification of alternating currents. The crossing nanowires produce nonlinear tunneling characteristics even in an unbiased state. Therefore the nanojunction photodetector can be operated at or near zero bias and requires very low power to operate. Consequently 1/f noise of the nanojunction detector is close to zero, resulting in a high detectivity.

High density nanojunction arrays of many nanojunction photodetectors may be created using conventional semiconductor fabrication techniques to enable ultra high resolution imaging.

Due to the electric potential barrier of the barrier layer at each nanojunction, dark current is very small, leading to a high signal-to-noise ratio. Further, given a frequency-tunable antenna coupled to the nanowires, the nanojunction sensor will allow multi spectral imaging of radiation within a spectral band ranging from terahertz to IR light.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is an antenna-coupled nanojunction photodetector and method of operation that senses tunneling current at a nanometer-scale tunneling junction (NTJ), rather than by conventional thermal or photon means. The nanojunction consist of a mesh of crossing nanowires and therefore lends itself to micro/nano fabrication techniques. Indeed, a large format array of nano-tunneling-junction-based detector can be formed on single FPA chip to provide the capability of simultaneous hyperspectral and polarimetric sensing within a spectral band. Moreover, the array enables uncooled, and low power multi-spectral imaging with a fast frame rate and temporal response, high directivity and high spatial resolution.

Figure 1B:
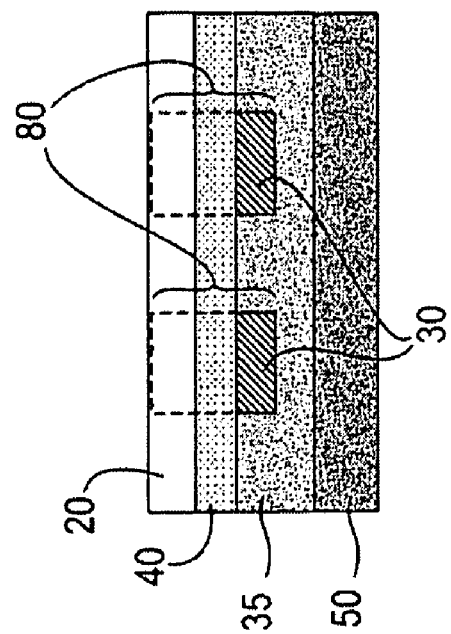
FIG. 1B is a cross section taken along line A-A of FIG. 1A.
Figure 1A:
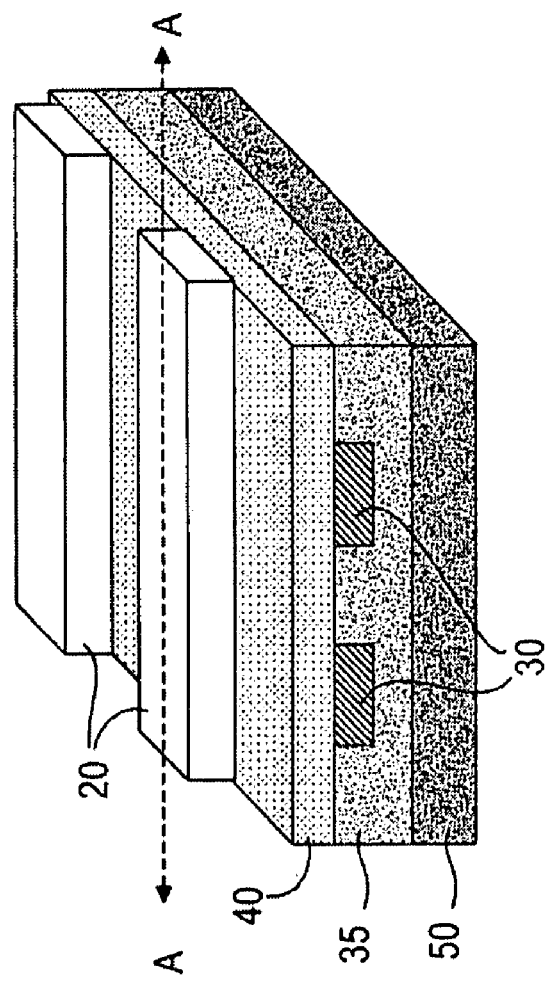
FIG. 1A is a perspective view of a nano junction photodetector array 2.

FIG. 1A is a perspective view of a nano junction photodetector array 2 comprising an exemplary set of four (4) nano tunnelinging junctions (NTJs) 80 with two stacks of nanowire arrays 20, 30 in a crossbar geometry interfaced with an ultra thin dielectric layer 40.

FIG. 1B is a cross section taken along line A-A of FIG. 1A. The nano junction photodetector array 2 comprises a base Silicon substrate 50 having a first dielectric layer 35 and two crossing stacks of nanowires 30 extending in a first direction and nanowires 20 extending in a second direction, although the relative orientation of the nanowires need not be necessarily orthogonal as shown. The nanowires 20, 30 are separated by a few nm thick dielectric barrier or "tunneling layer" 40 that forms a tunneling barrier between the two stacked nanowires 20, 30. The crossing nanowires are composed of two different materials or the same semiconductor material but with two different doping levels, thereby producing a junction having nonlinear tunneling characteristics (even in an unbiased state). In the illustrated embodiment nanowires 20 are semiconductor nanowires formed of, for example, silicon, while the opposing nanowires 30 are metal, for example, gold, platinum, Nickel, Aluminum, or silver. The illustrated dielectric layer 40 is formed of, for example, silicon oxide, silicon nitride, or high K (dielectric constant) materials. Thus, each cross junction 80 (the rectangular area 80 in FIG. 1B enclosing the two crossing nanowires 20, 30 and the barrier layer 40) forms a nanometer-sized Metal-Oxide-Semiconductor (MOS) vertical tunneling junction diode. Note that the dielectric material used for first dielectric layer 35 may be the same material as barrier layer 40 but does not necessarily have to be so. These two layer 35, 40 are separate during the fabrication process.

In operation of an exemplary NTJ 80, the principle of zero-bias electronic rectification is employed, in which the NTJ photodetectors utilize highly nonlinear current-voltage characteristics at a zero-bias condition for rectification of incoming photon signals. The incoming signal to each junction is picked up by an antenna (preferably both wavelength and polarization sensitive antenna), and the antenna is coupled directly to the respective nanowires 20, 30 and may even be integrally formed therewith as will be described. Given an AC signal source, the diode nanojunction 80 rectifies the AC signal and generates a DC signal for the readout circuitry. The charge flow across the nanojunction 80 is dominated by quantum mechanical tunneling rather than thermionic emission, and the nonlinear behavior of the tunneling current-voltage characteristics can be used for rectification of alternating currents.

The above-described array 2 lends itself to state-of-the-art nano-scale fabrication technology and tunneling-junction growth techniques in Si-MOS (Metal-Oxide-Semiconductor) diodes, for example.

Figure 1C:
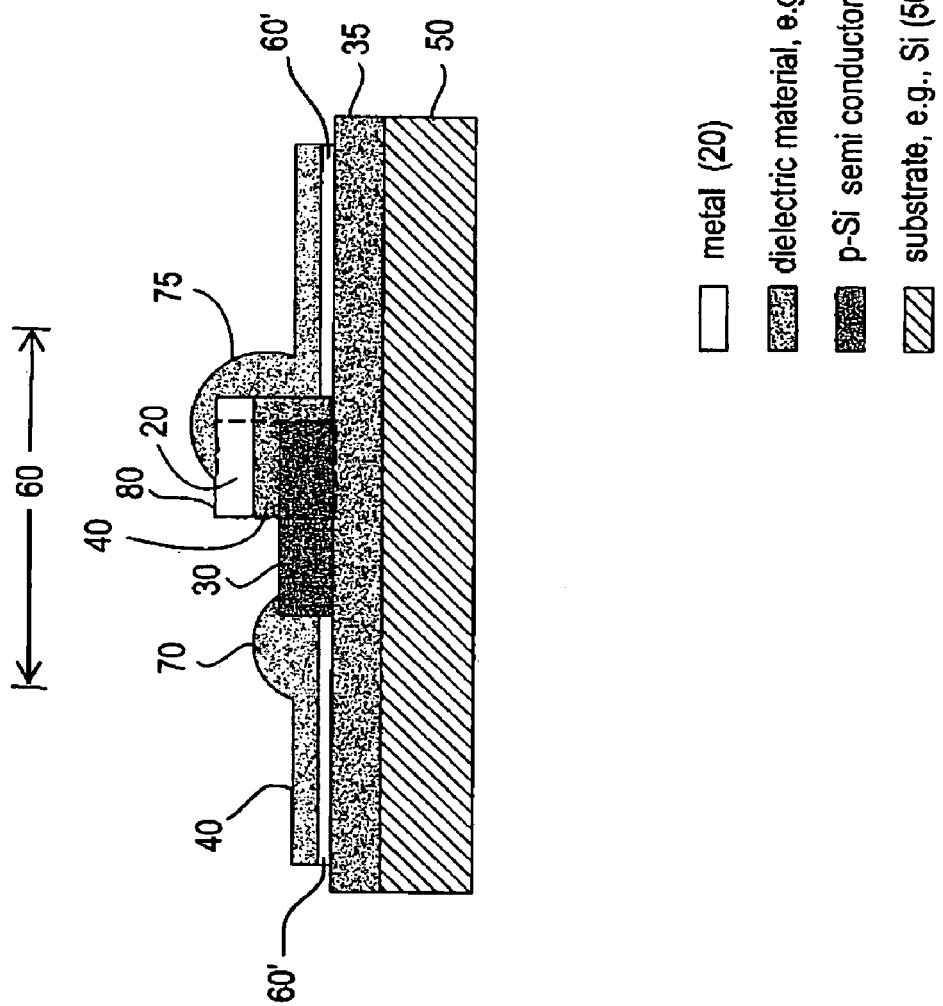
FIG. 1C is a cross sectional view of one of the nano tunneling junctions 80 as in FIGS. 1A-1B integrated with a wavelength-selective and polarization-sensitive slot antenna 60.

In addition, the above-described array 2 may be used in conjunction with various optical antenna designs. For example, FIG. 1C is a cross sectional view of one of the nano tunneling junctions 80 as in FIGS. 1A-1B integrated with a wavelength-selective and polarization-sensitive slot antenna 60. The antenna 60 is here coupled to both nanowires 20, 30 by integrally forming the slot antenna 60 on the same FPA chip.

The slot antenna 60 comprises a radiator formed by cutting a narrow slot in a larger metal surface 60'. The slot antenna 60 picks up the photon signal and couples it directly to the first and second nanowires 20, 30. The description applies to a dipole antenna, also. It is then rectified at the MOS junction 80 in accordance with its predetermined nonlinear current-versus-voltage characteristics to yield a DC output signal.

The embodiment of FIG. 1C provides a nanometer scale tunneling junction-based photodetector array with polarization sensitivity, which will enable uncooled multispectral polarimetry without front-end moving polarizers. Unlike conventional uncooled thermal detectors such as bolometers, the tunneling-junction detector of the present invention delivers a fast temporal response (a frame rate greater than kHz) over a broad spectral range with high spatial resolution concurrently obtainable. NEP (noise equivalent power) can be further improved by optimization of the NTJ's nonlinearity and by cooling. The heterodyne detection can dramatically improve the room-temperature NEP of the NTJ detectors. With proper scaling of tunneling-junction diodes into nanoscale, the junction capacitance $C_J$ is greatly reduced to ~aF range. With a parasitic or antenna resistance R of ~35 ohms in detector circuits, the detection cutoff frequency, $fc=1/(2\pi RC_J)$ is thus pushed into the visible spectrum. The metal/oxide/Si MOS junction 80, as shown in FIG. 1, has a highly non-linear I-V curve across zero bias with curvature γ of the MOS vertical tunneling diode (as exemplified by the non-linear I-V curves) of approximately forty (40) or greater, similar to existing germanium backward diodes. A higher γ translates to increased sensitivity, and the highest experimental value of γ at room-temperature known to the present inventors is ~75 from germanium p-n backward tunneling-diodes.

Further testing and proper optimization of the oxide tunneling barrier and NTJ in an MOS device, as well as the antenna characteristics, will provide exemplary performance in an uncooled photon detection device, and exemplary flexibility. The optically-resonant antenna coupling allows a selection of wavelengths and polarizations at the same time, offering multi/hyper spectral and polarimetric detection. Moreover, for a multi-color focal-plane-array, each row in a detector array can be construed with different wavelength-selective antennas.

The "curvature", $\gamma=(\delta^2 I/\delta V^2)/(\delta I/\delta V)$, of the non-linear I-V curves yields the detector sensitivity over the background Johnson noise.

Figure 2:
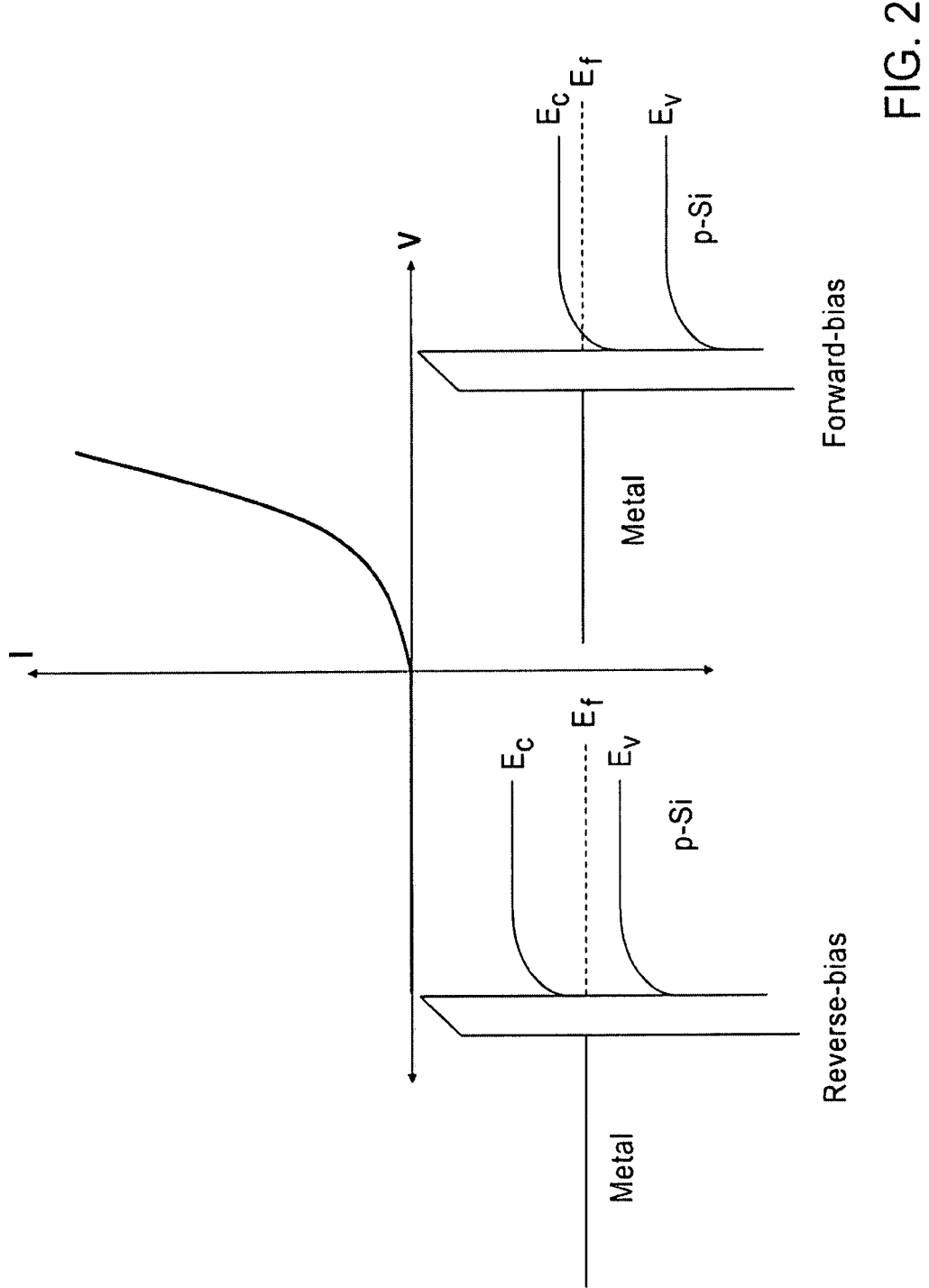
FIG. 2 shows band structure (Ec, Ev) diagrams of a MOS of nano tunneling junction 80 as in FIGS. 1B-1C under reverse and forward bias.

FIG. 2 shows band structure (Ec, Ev) diagrams of a MOS of nano tunneling junction 80 as in FIGS. 1B-1C under reverse and forward bias. Due to the asymmetry of the band structures under forward and reverse bias, the current versus voltage (I-V) curve across the zero-bias condition is highly nonlinear. I-V curvature γ of the p-Si MOS devices with optimized tunneling oxide thickness and dopant concentration is approximately 40.

Although conventional photodetectors are based on either photodiodes or thermal detectors, photon detection utilizing rectification through the non-linearity of I-V curves has remained untapped. This has been partially due to the lack of a lithographic capability to fabricate junctions in nanometer-scale. On the other hand, nano-scale metal/oxide/metal (MOM) junctions have been fabricated recently. The curvature γ measured at zero-bias is well below 10, resulting in the room-temperature detectivity D*(300 K) estimated as less than $10^9$ cmHz½/W. The D*(300 K) of MOM-based nano-junction detectors is comparable to that of bolometers.

In the present case, fabrication of Si-MOS NTJ detectors can be accomplished as a result of recent advances in scaled Si-CMOS technology and nanolithography.

With reference to FIGS. 1A-1C, one available fabrication process for the antenna-coupled nano tunneling junctions is discussed below.

The process begins with a semiconductor 30 on insulator 50, e.g., "SOI" surface, layers 30 and 50 being separated by a first dielectric layer 35. The semiconductor 30 layer may be silicon, the substrate 50 may be silicon, and the first dielectric layer 35 may be a typical and well-known insulative dielectric material such as $SiO_2$.

The first step is establishing a silicon nanowire 30 on the oxide surface of the SOI wafer. The silicon nanowire 30 can be formed using e-beam lithography followed by a step of reactive ion etching (RIE) of the e-beam patterned Si surface as seen at (C). Alternatively, the Si nanowires can be fabricated with RIE using a metal mask. A dielectric layer 40 such as $SiO_2$ is then deposited over the Si nanowire surfaces by, for example, atomic layer deposition (ALD), to establish a tunneling barrier layer 40 as seen at (D). The $SiO_2$ deposited surface 40 is then subjected to electron beam lithography and reactive ion etching as seen at (D) for subsequent integration of a feed line for an antenna 60. Metal nanowires or nanodots 20 (as seen at E) are formed over the tunneling barrier using e-beam lithography followed by deposition of the metal film to form vertical transport nano tunneling junctions. The slot antenna 60 along with an antenna feedline 70 is then integrated using lithography, RIE, and e-beam deposition of a metal layer. Finally, a dielectric layer is applied over the entire surface except over metal nanowire/nanodots 20, where the antenna feedlines 70 to the metal electrodes are formed. The fabrication described herein may be used for detectors integrated with slot or dipole dipole antennas given minor varitions well-known to thise skilled in the art.

Figure 3A:
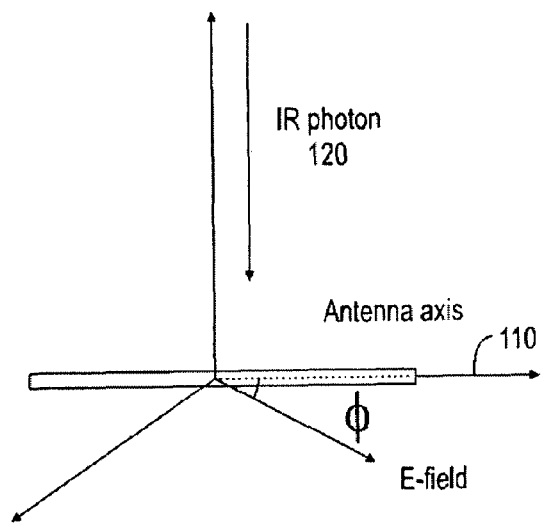
FIG. 3A illustrates the E-field orientation for an incident photon 120 on the antenna axis 110.
Figure 3B:
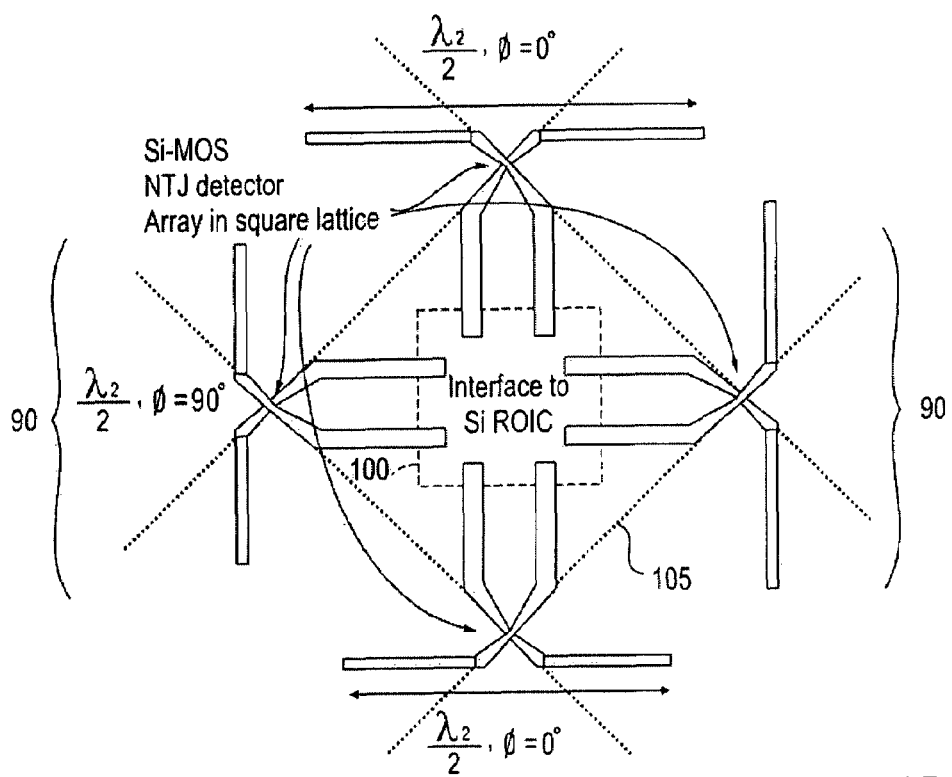
FIG. 3B shows a schematic of a 2-color and 2-polarization pixel 105 based on four antenna coupled Si-MOS NTJ detectors 90.

Thus, the signal-to-noise ratio in certain source detection can be improved with polarization. As seen in FIGS. 3A-3B, to incorporate polarization sensitivity in the foregoing construct, an array of antennas may each be coupled to a corresponding junction, each antenna being designed with wavelength-resonant and narrowband characteristics. For example, a set of NTJ photodetectors 90 with different antenna orientations (for instance, 0, 45, and 90, 135 degree) are fabricated within pixel(s) 105. FIG. 3A illustrates the E-field orientation for an incident photon 120 on the antenna axis 110. The detected signal is $V(\phi)=V_0+V_p^*\cos^2\phi$, where $\phi$ is the polarization angle with respect to a reference axis. With a 1:N multiplexing scheme in a read-out integrated circuit, the polarimetric sensing is implemented within a framework of an N×N FPA without front-end rotating wire-grid polarizer wheels.

Multispectral and polarimetric detection can be implemented in several different approaches. A first approach for multi-spectral (N=2–4 colors) detection is to use a series of optically-resonant narrow-band antennas with less than or equal to ten percent of the center wavelength.

FIG. 3B shows a schematic of a 2-color and 2-polarization pixel 105 based on four Si-MOS NTJ detectors 90. Readout of the detected signal can be done with 1:4 multiplexing in a Si readout integrated circuit 100. Any potential unwanted crosstalk between the antennas is accounted for in the design layout. Dimensions of the antennas are determined primarily by target wavelength and target impedance.

Figure 4:
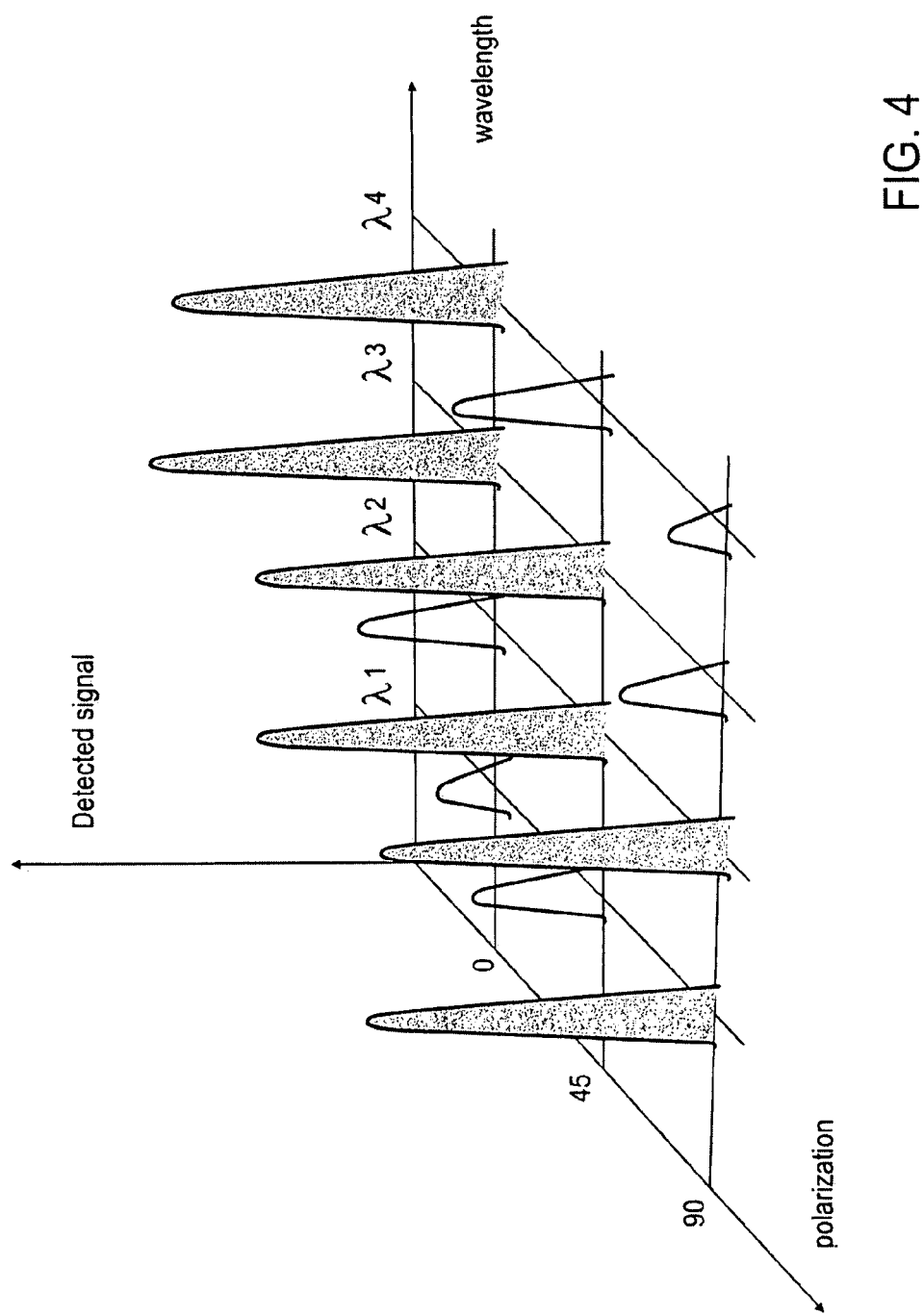
FIG. 4 illustrates a hypothetical photon signal discriminated by 4-color and 3-polarization pixels in terms of both wavelength and polarization.

FIG. 4 illustrates a hypothetical photon signal discriminated by 4-color and 3-polarization pixels in terms of both wavelength and polarization. The multispectral and polarimetric information "cube" enhances source recognition where multiple signals are present.

A second approach for multi- or hyperspectral detection based on Si-MOS NTJ detectors 2 is to utilize frequency tunable antennas. Implementation of frequency tunable antennas may be accomplished by varying the effective permeability or dielectric constant of the NTJ junction, or changing the antenna segments connected by diodes.

In all the foregoing cases it should be apparent that the improved photodetector array enables uncooled, frequency selective, and low-power multi-spectral imaging within a spectral band, as a result of trasnducing quantum mechanical tunneling at high density nano tunneling junctions rather than by conventional thermal or photodetectors. The photodetector array yields a fast frame rate and temporal response, high directivity and high spatial resolution, and is capable of simultaneous hyperspectral and polarimetric sensing on a single FPA chip. Moreover, no moving optical filters are necessary to process the incident photon signal.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A method of detecting photon signals to produce an image therefrom comprising the steps of:
    providing a metal-oxide semiconductor (MOS) junction defined by a first nanowire extending in one direction along a first plane, and a second nanowire extending in another direction along a second plane, and a dielectric barrier layer between said first and second planes; determining a nonlinear current-versus-voltage characteristic of said MOS junction in a zero bias condition; coupling an antenna to first and second nanowires for reception of a photon signal;
    rectifying an incident signal from said antenna at said MOS junction in accordance with the predetermined nonlinear current-versus-voltage characteristic to yield a DC output signal; and
    producing an optical image with said DC output signal.

2. The method of detecting photon signals according to claim 1, wherein said MOS junction comprises a vertical tunneling diode having non-linear current-voltage characteristics.

3. The method of detecting photon signals of claim 2 wherein said vertical tunneling diode operates in an uncooled or cooled condition.

4. The method of detecting photon signals of claim 2 where said vertical tunneling diode operates at room temperature or lower.

5. The method of detecting photon signals of claim 2, wherein a curvature characteristic β of said MOS vertical tunneling diode is approximately forty (40) or greater.

6. The method of detecting photon signals of claim 2, further comprising a plurality of MOS vertical tunneling diodes, each having a different slot antenna orientation, each fabricated within a single pixel for use with a 1:N multiplexing scheme to permit polarimetry.

7. The method of detecting photon signals of claim 1 wherein the first and second nanowires respectively comprise different materials that form a junction having nonlinear tunneling characteristics.

8. The method of detecting photon signals of claim 7 where the first nanowires comprise silicon and the second nanowires comprise any one from among a group of of chromium, nickel, platinum, palladium, aluminum, silver, gold or polycrystalline silicon.

9. The method of detecting photon signals of claim 7 where the dielectric barrier layer is formed of any one from among a group of silicon oxide, silicon nitride, and high K-dielectric materials.

10. The method of detecting photon signals of claim 9 where the high K-dielectric materials comprise any one from among a group of Hf02, Al203, Ti02, Ta205.

11. The method of detecting photon signals of claim 1 where the first and second nanowires respectively comprise materials with different doping levels that form a junction having nonlinear tunneling characteristics.

12. The method of detecting photon signals of claim 1, further comprising a step of selecting an antenna to optimize reception of photon signals of a predetermined wavelength.

13. The method of detecting photon signals of claim 1, further comprising a step of selectively receiving a particular-wavelength incident signal at said antenna.

14. The method of detecting photon signals of claim 13 wherein said step of selectively receiving the photon signals further comprises receiving a particular polarization incident signal.

15. The method of detecting photons signals of claim 1, consisting of no moving optical filters and polarizers.

16. The method of detecting photon signals of claim 1 wherein said step of receiving said photon signals is achieved by an array of antennas having wavelength-resonant and narrowband characteristics.

17. An photodetector comprising:
    a substrate;
    a first nanowire formed on said substrate and extending in one direction along a first plane;
    a second nanowire extending in another direction along a second plane;
    a dielectric barrier layer between said first and second planes;
    said first and second nanowires defining a metal-oxide semiconductor (MOS) junction having a nonlinear current-versus-voltage characteristic; and
    an antenna coupled to said first and second nanowires.

18. The photodetector of claim 17 wherein said metal-oxide semiconductor (MOS) junction defines a metal/oxide/(p or n)-Si (MOS) vertical tunneling diode.

19. The photodetector of claim 18 wherein said MOS vertical tunneling diode has zero dark current independent of operational temperature.

20. The photodetector of claim 17 wherein said substrate is semiconductor such as silicon and said barrier layer is high quality dielectric such as silicon oxide.

21. The photodetector of claim 17 where said first nanowires are perpendicular to said second nanowires.

22. The photodetector of claim 17 wherein said antenna is a slot antenna.

23. The photodetector of claim 17 wherein said antenna is frequency selectable.

24. The photodetector of claim 22 where said slot antenna is polarization sensitive.

* * * * *

UNITED STATES PATENT AND TRADEMARK OFFICE
CERTIFICATE OF CORRECTION

PATENT NO. : 7,501,636 B1 Page 1 of 1
APPLICATION NO. : 11/858230
DATED : March 10, 2009
INVENTOR(S) : Kyung-ah Son et al.

It is certified that error appears in the above-identified patent and that said Letters Patent is hereby corrected as shown below:

Title Page, Item (54) Title:

Delete "HYPERSPECTAL" and insert -- HYPERSPECTRAL --.

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,501,636 B1
APPLICATION NO.   : 11/858230
DATED             : March 10, 2009
INVENTOR(S)       : Kyung-ah Son et al.

It is certified that error appears in the above-identified patent and that said Letters Patent is hereby corrected as shown below:

Title Page, Item (54) and Column 1, line 2, Title:

Delete "HYPERSPECTAL" and insert -- HYPERSPECTRAL --.

This certificate supersedes the Certificate of Correction issued April 7, 2009.

Signed and Sealed this

Twenty-eighth Day of April, 2009

JOHN DOLL
*Acting Director of the United States Patent and Trademark Office*